Figure 1:
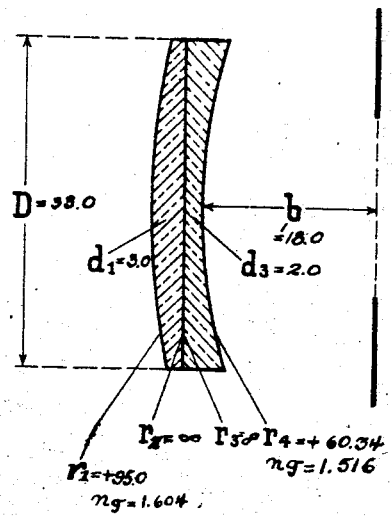

Aug. 2, 1927.

R. RICHTER 1,637,917

LENS ATTACHMENT FOR PHOTOGRAPHIC OBJECTIVES

Filed May 6, 1924

Inventor:
Robert Richter

Patented Aug. 2, 1927.

1,637,917

UNITED STATES PATENT OFFICE.

ROBERT RICHTER, OF BERLIN-FRIEDENAU, GERMANY, ASSIGNOR TO THE FIRM OPTISCHE ANSTALT C. P. GOERZ AKTIENGESELLSCHAFT, OF FRIEDENAU, NEAR BERLIN, GERMANY.

LENS ATTACHMENT FOR PHOTOGRAPHIC OBJECTIVES.

Application filed May 6, 1924, Serial No. 711,307, and in Germany May 12, 1923.

In order to enlarge the focal length of photographic objectives, dispersive lens attachments are often used amongst which there are some which consist of two lenses which either are cemented together or which are separated from each other by a small air-space. Such achromatic lens attachments as have been hitherto used yield however images which are not sharp at their periphery.

Now this invention has for its purpose to obviate this deficiency of the known achromatic lens attachments and secures the effect aimed at by using a lens system consisting of two lenses having their outer surfaces curved in the same direction and being so shaped and formed of such kinds of glass that the sum of the refractive powers of the two inner surfaces of the system is not greater than the positive numerical value of the refractive power of the system as a whole, it being assumed that such system is combined with the photographic objective in this way that its hollow surface is turned towards the objective. The curvature of the hollow surface being only small so that the radius of curvature is materially larger than the diameter of the system. A lens system of this kind makes it possible to obtain a good chromatic correction and this without impairing the good comatic and astigmatic correction which, as is well known, is inherent to the meniscus form in a simple lens; this effect being not impaired in this case by the inner surfaces of the system which are provided for eliminating chromatic aberration although it is true with such a lens system a complete correction of the spherical aberration in the midst of the image cannot be obtained. The impossibility of completely correcting the spherical aberration in the midst of the image, however, restricts the use of this kind of lens attachment to objectives of minor diameter such as used in connection with hand-cameras.

Particularly simple conditions for the manufacture are secured if both the inner surfaces of the system are plane, such shaping of the surfaces being possible without impairing the correction of the aberrations of the system.

If the system is constructed with plane inner surfaces then it is advisable to manufacture that lens, which turns its concave surface outwardly, from a kind of glass which has a lower refraction index than the lens which turns its convex surface outwardly. The construction of the system in this way allows to construct the lenses with only comparatively slightly curved outer surfaces.

The use of plane inner surfaces for the lenses of the system allows of conveniently inserting a light filter between the two lenses of the system, this being particularly of importance for lens attachments of the kind here in question because same are often used for landscape tele-exposures.

Figure 2:
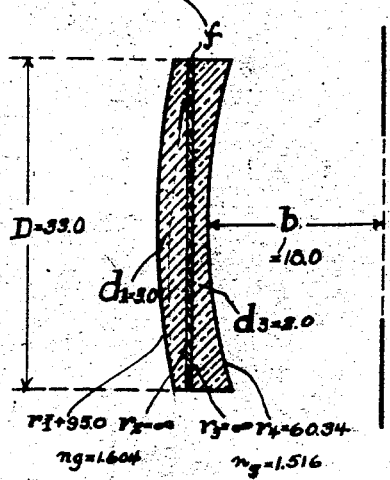

An embodiment of the new lens attachment is illustrated in the drawings, in which:

Figure 1 shows the lens attachment without light filter. Figure 2 shows the lens attachment with light filter inserted between the two plane inner surfaces of the lenses.

The constructional data of the embodiment is as follows:

$r_1 = +95,0$ mm.
$r_2 = \infty$ mm. } $d_1 = 3,0$ mm. Barint 604/494 cemented.
$r_3 = \infty$ mm.
$r_4 = +60,34$ mm. } $d_2 = 2,0$ mm. Kron 516/640.

In this schedule the reference-letters $r_1$, $r_2$, $r_3$, $r_4$ designate the radii of curvature of the lens surfaces of the system, $d_1$ and $d_2$ are the thicknesses of the lenses, the terms Barint and Kron designate the kinds of glass in conformity with the designation in the catalogue of Sendlinger Optische Glaswerke of Berlin-Zehlendorf. The numerals appearing in connection with the glass designations designate the corresponding refraction index and the dispersion in this way that the glass designated Barint 604/494 is a glass having a refraction index $n_D = 1,604$ and a reciprocal value of the dispersion $$\nu = \frac{n_D - 1}{n_F - n_C} = 49,4.$$

Similarly the glass designated Kron 516/640 has the refraction index $n_D = 1,516$ and the reciprocal value of the dispersion $$\nu = 64,0.$$

The diameter D of the system is 33,0 mm. its focal length $f = -0,5$ m. and consequently its refractive power $= -2$ dioptries or the positive numerical value equal to 2. The inner surfaces of the attachment lens system being plane surfaces the refractive power of each of these surfaces is equal to 0, consequently also the sum of the refractive powers of the two surfaces is equal to 0. This amount is smaller than the numeral value of the refractive power of the whole attachment lens system which as above stated was equal to 2.

The entrance-pupil of the objective is positioned at a distance $b-18$ mm. behind the surface with the radius of curvature $r_4$.

What I claim is:—

1. A dispersive achromatic two lens attachment for photographic objectives having its outer surfaces curved in the same direction, the radius of curvature of the concave outer surface being materially larger than the diameter of the system the lenses of the system being so shaped and manufactured of such kinds of glass that the sum of the refractive powers of the two inner surfaces of the system is not greater than the positive numerical valve of the refractive power of the whole system.

2. A dispersive achromatic two lens attachment for photographic objectives having its outer surfaces curved in the same direction and consisting of lenses with plane inner surfaces the radius of curvature of the concave outer surface being materially larger than the diameter of the system.

3. A dispersive achromatic two lens attachment for photographic objectives having its outer surfaces cured in the same direction and consisting of lenses having plane inner surfaces which are cemented together the radius of curvature of the concave outer surface being materially larger than the diameter of the system.

4. A dispersive achromatic two lens attachment for photographic objectives having its outer surfaces curved in the same direction and consisting of lenses with plane inner surfaces, the lens with outwardly turned concave surface being manufactured from a kind of glass having a smaller index of refraction and of dispersion than the glass from which the other lens with outwardly turned convex surface is manufactured and having such curvature of its concave surface that the radius of curvature is materially larger than the diameter of the system.

In testimony whereof I have signed this specification.

Dr. ROBERT RICHTER.